(12) United States Patent
Tang

(10) Patent No.: US 11,218,927 B2
(45) Date of Patent: Jan. 4, 2022

(54) RADIO COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/689,844

(22) Filed: Nov. 20, 2019

(65) Prior Publication Data
US 2020/0112895 A1  Apr. 9, 2020

Related U.S. Application Data

(63) Continuation of application No. PCT/CN2018/076670, filed on Feb. 13, 2018.

(51) Int. Cl.
*H04W 36/00* (2009.01)
*H04W 76/30* (2018.01)
(Continued)

(52) U.S. Cl.
CPC .... *H04W 36/00837* (2018.08); *H04B 7/0413* (2013.01); *H04B 7/0617* (2013.01);
(Continued)

(58) Field of Classification Search
CPC ........... H04W 36/00837; H04W 76/30; H04W 76/27; H04W 36/0072; H04W 36/32; H04W 36/08; H04W 48/20; H04W 72/042; H04W 48/18; H04W 16/14; H04W 72/04; H04W 76/19; H04W 16/28; H04W 76/10;
(Continued)

(56) References Cited

U.S. PATENT DOCUMENTS

2013/0295951 A1* 11/2013 Mach .................... H04W 36/32
455/456.1
2015/0319744 A1* 11/2015 Jung ................. H04W 72/0406
370/328
(Continued)

FOREIGN PATENT DOCUMENTS

| CN | 104871608 A | 8/2015 |
|---|---|---|
| CN | 106658758 | 5/2017 |

(Continued)

OTHER PUBLICATIONS

WIPO, ISR for PCT/CN2018/076670, Nov. 5, 2018.
(Continued)

*Primary Examiner* — Fred A Casca
(74) *Attorney, Agent, or Firm* — Hodgson Russ LLP

(57) ABSTRACT

Disclosed are a radio communication method, a terminal device and a network device. The method comprises: a terminal device acquiring a mobility control parameter for executing cell selection and re-selection in an inactive state. The method, the terminal device and the network device of the embodiments of the present application facilitate controlling the mobility of a terminal device in an inactive state.

3 Claims, 3 Drawing Sheets

(51) Int. Cl.

| | |
|---|---|
| *H04W 76/27* | (2018.01) |
| *H04W 36/32* | (2009.01) |
| *H04W 36/06* | (2009.01) |
| *H04W 36/08* | (2009.01) |
| *H04W 36/14* | (2009.01) |
| *H04W 16/28* | (2009.01) |
| *H04B 7/185* | (2006.01) |
| *H04B 7/0413* | (2017.01) |
| *H04B 7/06* | (2006.01) |
| *H04B 7/08* | (2006.01) |
| *H04B 7/0452* | (2017.01) |

(52) U.S. Cl.
CPC ........... *H04B 7/0626* (2013.01); *H04B 7/088* (2013.01); *H04B 7/18541* (2013.01); *H04W 16/28* (2013.01); *H04W 36/00* (2013.01); *H04W 36/0016* (2013.01); *H04W 36/0072* (2013.01); *H04W 36/06* (2013.01); *H04W 36/08* (2013.01); *H04W 36/14* (2013.01); *H04W 36/32* (2013.01); *H04W 76/27* (2018.02); *H04W 76/30* (2018.02); *H04B 7/0452* (2013.01); *H04B 7/18504* (2013.01)

(58) Field of Classification Search
CPC ............. H04W 36/00; H04W 36/0033; H04W 36/0079; H04W 36/14; H04W 36/0016; Y02D 70/1242; Y02D 70/21; H04B 7/0695; H04B 17/318; H04B 7/0617; H04B 7/0639; H04B 7/088; H04B 17/327; H04B 7/02; H04B 7/0413; H04B 7/06; H04B 7/0626
See application file for complete search history.

(56) References Cited

U.S. PATENT DOCUMENTS

| | | | | |
|---|---|---|---|---|
| 2016/0360537 | A1* | 12/2016 | Palenius | H04W 24/10 |
| 2019/0082490 | A1* | 3/2019 | Zhang | H04W 48/08 |
| 2020/0120547 | A1* | 4/2020 | Han | H04W 36/0079 |
| 2020/0120592 | A1* | 4/2020 | Geng | H04W 36/08 |

FOREIGN PATENT DOCUMENTS

| | | | |
|---|---|---|---|
| CN | 107105460 | A | 8/2017 |
| CN | 107249221 | | 10/2017 |
| CN | 107645753 | | 1/2018 |
| CN | 108307373 | A | 7/2018 |
| EP | 2802168 | | 11/2014 |
| RU | 2602983 | | 11/2016 |
| WO | 2011076063 | A1 | 6/2011 |
| WO | 2018002447 | | 1/2018 |

OTHER PUBLICATIONS

European Patent Office, European Search Report for EP Application No. 18906373.8, dated Jun. 3, 2020.
Ericsson, "NR RRC States overview and remaining open issues", 3GPP Draft; R2-1713301, Nov. 17, 2017.
LTE, "Evolved Universal Terrestrial Radio Access (E-UTRA); User Equipment (UE) procedures in idle mode", 3GPP TS 36.304 version 10.8.0 Release 10, Technical Specification, European Telecommunications Standards Institute (ETSI), Mar. 1, 2014.
ITRI, "Discussion on RRC State Transition between connected and Inactive", 3GPP Draft; R2-1706930, Jun. 26, 2017.
3rd Generation Partnership Project; Technical Specification Group Radio Access Network; Evolved Universal Terrestrial Radio Access (E-UTRA); User Equipment (UE) procedures in idle mode (Release 14), Sep. 2016.
ETSI MCC, "Report of 3GPP TSG RAN WG2 meeting #95 Goteborg, Sweden, Aug. 22-26, 2016", Oct. 2016.
ETSI MCC, "Report of 3GPP TSG RAN WG2 meeting #94 Nanjing, China, May 23-27, 2016", Aug. 2016.
EPO, Communication pursuant to Article 94(3) EPC for EP 18906373. 8, dated Nov. 4, 2020.
Samsung, "Speed dependant parameters in NR IDLE and INACTIVE mode mobility", 3GPP TSG-RAN WG2 2017 RAN2 # 99bis Meeting, R2-1711722, 3 pages, Oct. 9, 2017, Prague, Czech.
SIPO, Notice Of Allowance for CN 201911327763.6, dated Dec. 29, 2020.
SIPO, First Office Action for CN 201911327763.6, dated Nov. 3, 2020.
Huawei et al., "The procedure to activate RRC inactive connected mode", SA WG2 Meeting #S2-116BIS, S2-164563, 4 pages, Aug. 29, 2016, Sanya, China.
QUALCOMM Incorporated, "Cell selection and reselection for NR," 3GPP TSG-RAN2 NR AH#0118, R2-1800212, Jan. 2018, 4 pages.
"3rd Generation Partnership Project; Technical Specification Group Radio Access Network; Evolved Universal Terrestrial Radio Access (E-UTRA); User Equipment (UE) procedures in idle mode (Release 10)," 3GPP TS 36.304, Mar. 2014, v10.8.0, 33 pages.
EPO, Communication for EP Application No. 18906373.8, dated Mar. 17, 2021.
JPO, Office Action for JP Application No. 2019-565197, dated Mar. 23, 2021.
FSIP, Office Action for RU Application No. 2019142495/07, dated Mar. 23, 2021.
ISDEC, Office Action for CA Application No. 3066033, dated Feb. 23, 2021.
INAPI, Office Action for CL Application No. 201903830, dated May 20, 2021.
IPI, Office Action for IN Application No. 201917046770, dated Jun. 3, 2021.
KIPO, Office Action for KR Application No. 10-2019-7034503, dated Oct. 25, 2021.

* cited by examiner

RADIO COMMUNICATION METHOD, TERMINAL DEVICE AND NETWORK DEVICE

CROSS-REFERENCE TO RELATED APPLICATION

This application is a continuation of International Application No. PCT/CN2018/076670, filed Feb. 13, 2018, the entire disclosure of which is incorporated herein by reference.

TECHNICAL FIELD

Embodiments of the present application relate to the field of communications, and more particularly, to a method for wireless communication, a terminal device, and a network device.

BACKGROUND

In New Radio (NR), for purposes of reducing new radio signaling, recovering wireless connections quickly and recovering data services quickly, a new Radio Resource Control (RRC) state, namely an RRC inactive (RRC_INACTIVE) state, is defined. How to perform cell selection and reselection in the RRC inactive state by a terminal device is a problem to be solved.

SUMMARY

In view of this, embodiments of the present application provide a method, a terminal device, and a network device for wireless communication, which are advantageous for controlling mobility of a terminal device in an inactive state.

In a first aspect, there is provided a method for wireless communication, including: obtaining, by a terminal device, a mobility control parameter for performing cell selection and reselection in an inactive state.

In a possible implementation manner, the obtaining, by a terminal device, the mobility control parameter for performing cell selection and reselection in an inactive state includes: obtaining, by the terminal device, a mobility control parameter configured for the inactive state from RRC dedicated signaling sent by a network device.

In a possible implementation manner, the method further includes: receiving, by the terminal device, a radio resource control (RRC) connection release message sent by the network device, wherein the RRC connection release message is used to instruct the terminal device to enter the inactive state, and the RRC connection release message carries the mobility control parameter. The obtaining, by the terminal device, the mobility control parameter configured for the inactive state from RRC dedicated signaling sent by a network device includes: obtaining, by the terminal device, the mobility control parameter configured for the inactive state from the RRC connection release message.

In a possible implementation, obtaining, by the terminal device, the mobility control parameter for recovering a radio resource control (RRC) connection in the inactive state, includes: obtaining, by the terminal device, the mobility control parameter from a system broadcast message.

In a possible implementation manner, the method further includes: if the terminal device obtains the mobility control parameter configured for the inactive state from the system broadcast message, performing cell selection and reselection by using the mobility control parameter configured for the inactive state when the terminal device is in the inactive state; if the terminal device does not obtain the mobility control parameter configured for the inactive state from the system broadcast message, performing cell selection and reselection by using the mobility control parameter configured for an idle state when the terminal device is in the inactive state.

In a possible implementation manner, the mobility control parameter includes at least one of the following parameters: a decision parameter of a mobile state of the terminal device, a scaling parameter of each parameter of a mobile state of the terminal device, and a frequency-based cell reselection priority parameter.

In a possible implementation manner, the method further includes: receiving, by the terminal device, indication information sent by the network device when the terminal device returns from the inactive state to the idle state, wherein the indication information is used to indicate the mobility control parameter used when the terminal device is in the idle state, and the mobility control parameter used when the terminal device is in the idle state is the mobility control parameter configured for the inactive state or the mobility control parameters configured for the idle state.

In a possible implementation manner, the indication information is carried in a signaling indicating that the terminal device transits from the inactive state to the idle state or a system broadcast message.

In a second aspect, there is provided a method for wireless communication, including: configuring, by a network device, a mobility control parameter for an inactive state for a terminal device; and sending, by the network device, the mobility control parameter for the inactive state to the terminal device.

In a possible implementation manner, the sending, by the network device, the mobility control parameter for the inactive state to the terminal device includes: sending, by the network device, the mobility control parameter for the inactive state to the terminal device through a radio resource control (RRC) dedicated signaling or a system broadcast message.

In a possible implementation manner, the RRC dedicated signaling is an RRC connection release message, wherein the RRC connection release message is used to instruct the terminal device to enter the inactive state.

In a possible implementation, the method further includes: sending, by the network device, indication information to the terminal device when the terminal device returns from the inactive state to the idle state, wherein the indication information is used to indicate the mobility control parameter used when the terminal device is in the idle state, and the mobility control parameter used when the terminal device is in the idle state is the mobility control parameter configured for the inactive state or the mobility control parameter configured for the idle state.

In a possible implementation manner, the indication information is carried in a signaling indicating that the terminal device transits from the inactive state to the idle state or the system broadcast message.

In a possible implementation manner, the mobility control parameter includes at least one of the following parameters: a decision parameter of a mobile state of the terminal device, a scaling parameter of each parameter of a mobile state of the terminal device, and a frequency-based cell reselection priority parameter.

In a third aspect, a terminal device is provided for performing the method of the above first aspect or any of the possible implementations of the first aspect. In particular, the terminal device includes units for performing the method of the above first aspect or any of the possible implementations of the first aspect.

In a fourth aspect, a network device is provided for performing the method of the above second aspect or any of the possible implementations of the second aspect. In particular, the network device includes units for performing the method of the above second aspect or any of the possible implementations of the second aspect.

In a fifth aspect, there is provided a terminal device, including: a memory, a processor, an input interface, and an output interface. The memory, the processor, the input interface, and the output interface are connected by a bus system. The memory is for storing instructions, and the processor is for executing the instructions stored in the memory to perform the method of the above first aspect or any of the possible implementations of the first aspect.

In a sixth aspect, there is provided a network device, including: a memory, a processor, an input interface, and an output interface. The memory, the processor, the input interface, and the output interface are connected by a bus system. The memory is for storing instructions, and the processor is for executing the instructions stored in the memory to perform the method of the above second aspect or any of the possible implementations of the second aspect.

In a seventh aspect, a computer storage medium is provided for storing computer software instructions used in the method of the above first aspect or any of the possible implementations of the first aspect or the method of the above second aspect or any of the possible implementations of the second aspect in which a program designed to perform the above aspects is included.

In an eighth aspect, a computer program product including instructions is provided, when executed on a computer, the computer is made to perform the method of the above first aspect or any of the possible implementations of the first aspect or the method of the above second aspect or any of the possible implementations of the second aspect.

These and other aspects of the present application will be more readily apparent from the following description of the embodiments.

DETAILED DESCRIPTION

Figure 1:
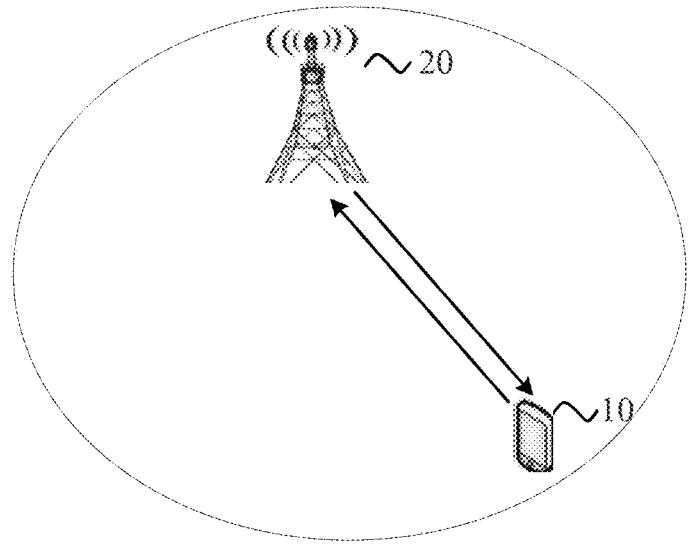
FIG. 1 shows a schematic diagram of an application scenario of an embodiment of the present application.

The technical solutions in the embodiments of the present application will be clearly and completely described in the following with reference to the drawings in the embodiments of the present application.

It should be understood that the technical solutions of the embodiments of the present application may be applied to various communication systems, such as a Global System of Mobile communication (GSM) system, a Code Division Multiple Access (CDMA) system, and a Wideband Code Division Multiple Access (WCDMA) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX), a New Radio (NR), a future 5G system or the like.

In particular, the technical solutions of the embodiments of the present application may be applied to various communication systems based on non-orthogonal multiple access technology, such as a Sparse Code Multiple Access (SCMA) system, and a Low Density Signature (LDS) system, etc., and the SCMA system and the LDS system may also be referred to as other names in the communication field; further, the technical solutions of the embodiments of the present application may be applied to a multi-carrier transmission system using the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system, a Filtered-OFDM (F-OFDM) system, and the like using the non-orthogonal multiple access technology.

A terminal device in the embodiments of the present application may refer to user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication capability, a computing device or other processing devices connected to a wireless modem, an in-vehicle device, a wearable device, a terminal device in a future 5G network, or a terminal device in a future evolution of a Public Land Mobile Network (PLMN), etc., which is not limited in the embodiments of the present application.

The network device in the embodiments of the present application may be a device for communicating with the terminal device. The network device may be a Base Transceiver Station (BTS) in the GSM or the CDMA, or a base station (NodeB, NB) in the WCDMA system, or an Evolutional NodeB (eNB or eNodeB) in the LTE system, or a wireless controller in a Cloud Radio Access Network (CRAN) scenario, or the network device may be a relay station, an access point, an in-vehicle device, a wearable device, and a network device in a future 5G network or a network device in a future evolved PLMN network, which is not limited in the embodiments of the present application.

FIG. 1 is a schematic diagram of an application scenario of an embodiment of the present application. A communication system in FIG. 1 may include a terminal device 10 and a network device 20. The network device 20 is configured to provide communication service for the terminal device 10 and make the terminal device 10 access the core network. The terminal device 10 may access the network by searching for a synchronization signal, a broadcast signal, and the like transmitted by the network device 20, thereby performing communication with the network. Arrows shown in FIG. 1 may represent uplink/downlink transmissions by cellular links between the terminal device 10 and the network device 20.

Figure 2:
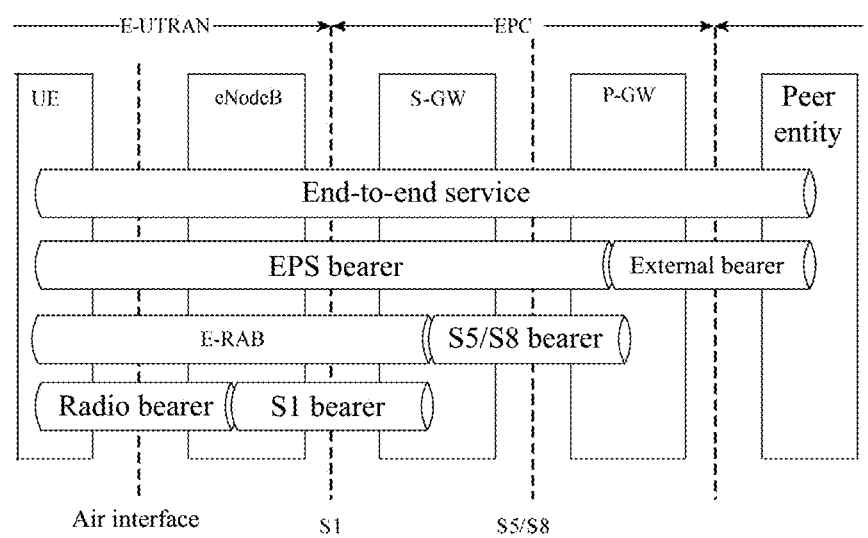
FIG. 2 shows a schematic block diagram of an EPS bearer service architecture.

In order to facilitate the understanding of the embodiments of the present application, some elements in the Evolved Packet System (EPS) bearer service architecture are briefly described in conjunction with FIG. 2. As shown in FIG. 2, the network architecture mainly includes an Evolved-Universal Mobile Telecommunication System Terrestrial Radio Access Network (E-UTRAN) and an Evolved Packet Core (EPC). The EPC includes a Serving Gateway (S-GW) and a Packet Data Network Gateway (P-GW). In the EPS bearer service architecture, the end-to-end service may be decomposed into two parts: the EPS bearer and the external bearer. one Evolved Radio Access Bearer (E-RAB) is used to transmit a packet of one EPS bearer between the UE and the evolved EPC, and the E-RAB and EPS bearer are in a one-to-one correspondence. One radio bearer is used to transmit a packet of one E-RAB bearer between the UE and the eNodeB, and the radio bearer and the E-RAB/EPS bearer are in a one-to-one correspondence. One S1 bearer is used to transmit a packet of one E-RAB bearer between the eNodeB and the S-GW. One S5/S8 bearer is used to transmit a packet of one EPS bearer between the S-GW and the P-GW, and the external bearer is used to transmit information between the EPC and a peer entity.

In the LTE system, the RRC state of the UE mainly includes an RRC idle state and an RRC connection state. The RRC idle state is such a state: there is an S5/S8 bearer, there is no radio bearer and S1 bearer, the core network side reserves the UE context, the eNodeB and the UE do not reserve each other's context, and the terminal reserves an unique identifier (which is generally a Temporary Mobile Subscriber Identity (TMSI)) within the Time Advance (TA). The UE in the RRC idle state does not interact data with the network, does not have a Discontinuous Reception (DRX) process configured by a Non-access stratum (NAS), system information broadcast and paging, neighbor cell measurement, and the mobility of cell reselection, and does not have the behavior of reporting a measurement report and the like. The RRC connection state is such a state: there are the S5/S8 bearer, the S1 bearer, and the radio bearer; the core network, eNodeB, and UE all reserve corresponding contexts, and the eNodeB allocates an access stratum (AS) identifier (usually a Cell Radio Network Temporary Identifier (C-RNTI)). The UE in the RRC connection state may exchange data with the network, and may have the DRX configured by the AS, the mobility of the handover, and the behavior of reporting the channel measurement to the network side and the like.

In the 5G system, a third state, that is, an RRC inactive state, is introduced. The RRC inactive state is such a state: there are the S5/S8 bearer, the S1 bearer, and a part of the radio bearer, the core network, the eNodeB, and the UE all reserve the corresponding context, and the eNodeB allocates the access stratum AS identifier (usually a Resume identification (ID)). The UE in the RRC inactive state has the mobility of cell reselection, has no measurement report, and may perform small data transmission and reception, and there may be DRX configured by the AS.

Figure 3:
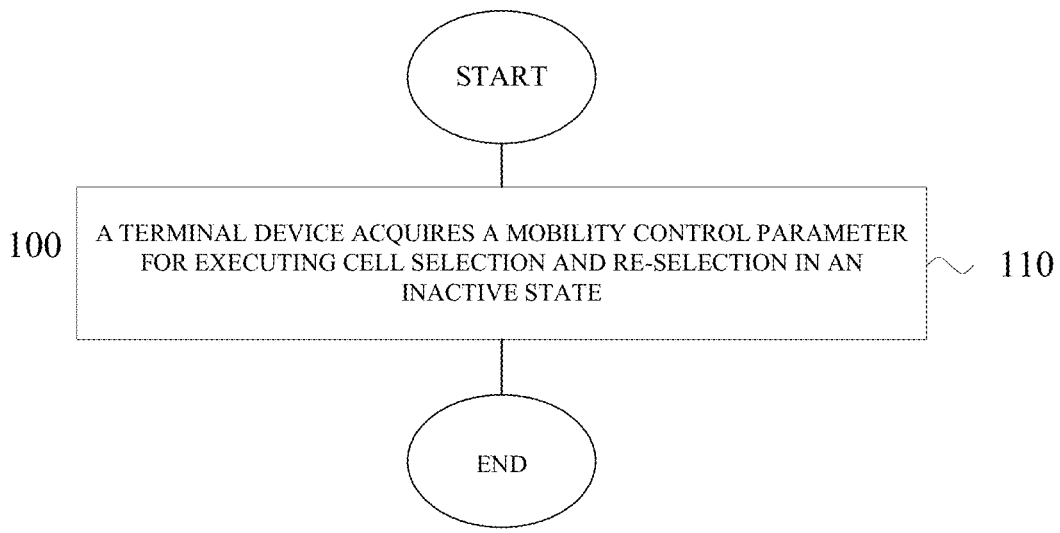
FIG. 3 shows a schematic block diagram of a method for wireless communication of an embodiment of the present application.

FIG. 3 shows a schematic block diagram of a method 100 for wireless communication in accordance with an embodiment of the present application. As shown in FIG. 3, the method 100 includes some or all of the following.

In S110, the terminal device obtains a mobility control parameter for performing cell selection and reselection in an inactive state.

It should be understood that the inactive state involved in the embodiments of the present application is also the above RRC active state. The terminal device may obtain the mobility control parameter for performing cell selection and reselection in the inactive state, for example, through RRC dedicated signaling or a system broadcast message. The mobility control parameter may include at least one of the following parameters: a decision parameter of a mobile state of the terminal device, a scaling parameter of each parameter of a mobile state of the terminal device, and a frequency-based cell reselection priority parameter. The so called mobile state of the terminal device may be defined as the number of cell reselections within a predetermined time, and may include a high-speed mobile state, a medium-speed mobile state, and a normal mobile state. The decision parameter of the mobile state of the terminal device may be, for example, a time window $T_{CRmax}$ for indicating that the terminal device enters the medium-speed or high-speed mobile state decision, or a cell reselection number threshold $N_{CR\_H}$ for indicating the high-speed mobile state decision, or a cell reselection number threshold $N_{CR\_M}$ for indicating the medium-speed mobile state decision, or a time window $T_{CRmaxHyst}$ for indicating that the terminal device leaves the medium-speed or high-speed mobile state decision. The scaling parameter is some of the secondary parameters used in the cell selection and reselection parameters, and in fact, it is a value. Each parameter of the mobile state of the mobile device may be multiplied by a scaling factor and then used in the decision of cell selection or reselection to reduce the impact of moving speed on the mobile performance of the mobile device. The frequency-based cell reselection priority parameter refers to an absolute priority between different frequencies, and is a parameter needing to be considered by the terminal device when performing cell selection and reselection.

Optionally, in the embodiments of the present application, the obtaining, by the terminal device, the mobility control parameter for performing cell selection and reselection in the inactive state includes: obtaining, by the terminal device, the mobility control parameter configured for the inactive state from RRC dedicated signaling sent by a network device.

The network device may specifically configure a specific mobility control parameter for the terminal device in the RRC inactive state to perform cell selection and reselection when the terminal device is in the RRC inactive state, and by configuring the specific mobility control parameter for the terminal device in the RRC inactive state, the mobility control of the terminal device can be more accurate. The network device may indicate the mobility control parameter to the terminal device through RRC dedicated signaling.

Further, the terminal device may receive the radio resource control RRC connection release message sent by the network device, where the RRC connection release message is used to instruct the terminal device to enter the inactive state, and the RRC connection release message carries the mobility control parameter; the terminal device may obtain the mobility control parameter configured for the inactive state from the RRC connection release message.

When the terminal device is in the RRC active state, if the service is not performed temporarily, the network device may instruct the terminal device to enter the inactive state. For example, an indication or a release cause value may be added to the RRC connection release message to instruct the terminal device to enter the inactive state. Meanwhile, the mobility control parameter for the inactive state configured by the network device for the terminal device may be carried in the RRC connection release message.

Optionally, in the embodiments of the present application, the terminal device obtains the mobility control parameter for recovering a radio resource control RRC connection in the inactive state, including: obtaining, by the terminal device, the mobility control parameter from a system broadcast message.

If the terminal device can obtain the mobility control parameter from the RRC dedicated signaling, the terminal device may perform cell selection and reselection using the mobility control parameter obtained in the RRC dedicated signaling; and if the terminal device cannot obtain the mobility control parameter from the RRC dedicated signaling, the terminal device may perform cell selection and reselection using the mobility control parameter obtained from the system broadcast message.

Optionally, in the embodiments of the present application, the method further includes: if the terminal device obtains the mobility control parameter configured for the inactive state from the system broadcast message, the mobility control parameter configured for the inactive state is used to perform cell selection and reselection when the terminal device is in the inactive state; or if the terminal device does not obtain the mobility control parameter configured for the inactive state from the system broadcast message, the mobility control parameter configured for an idle state is used to perform cell selection and reselection when the terminal device is in the inactive state. Specifically, the system broadcast may broadcast the mobility control parameter configured for the idle state, and may also broadcast the mobility control parameter configured for the inactive state.

Optionally, in the embodiments of the present application, the method further includes: when the terminal device returns from the inactive state to the idle state, the terminal device receives indication information sent by the network device, where the indication information is used to indicate the mobility control parameter used when the terminal device is in the idle state, and the mobility control parameter used when the terminal device is in the idle state is the mobility control parameter configured for the inactive state or the mobility control parameter configured for the idle state.

When the terminal device returns from the inactive state to the idle state, the network device may instruct the terminal device to continue to use the mobility control parameter configured for the inactive state or use the mobility control parameter configured for the idle state. Specifically, the indication information is carried in a signaling indicating that the terminal device transits from the inactive state to the idle state or the system broadcast message.

Figure 4:
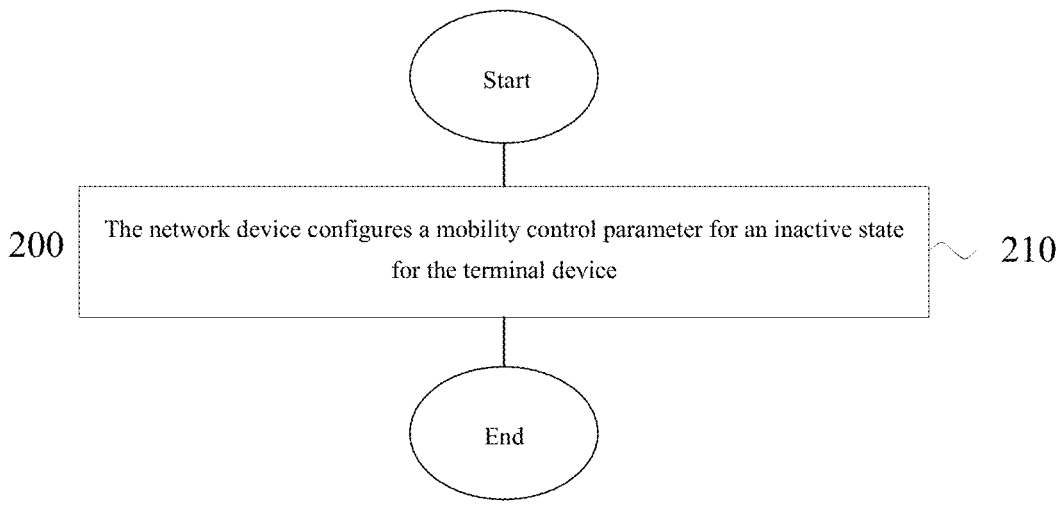
FIG. 4 shows another schematic block diagram of a method for wireless communication of an embodiment of the present application.

FIG. 4 shows a schematic block diagram of a method 200 for wireless communication in an embodiment of the present application. As shown in FIG. 4, the method 200 includes some or all of the following.

In S210, the network device configures the mobility control parameter for the inactive state for the terminal device.

Therefore, the method of the embodiments of the present application is advantageous for controlling the mobility of the terminal device in an inactive state.

Optionally, in the embodiments of the present application, the configuring, by a network device, the mobility control parameter for an inactive state for a terminal device includes: sending, by the network device, the mobility control parameter for the inactive state to the terminal device through a radio resource control RRC dedicated signaling or a system broadcast message.

Optionally, in the embodiments of the present application, the RRC dedicated signaling is an RRC connection release message, and the RRC connection release message is used to instruct the terminal device to enter the inactive state.

Optionally, in the embodiments of the present application, the method further includes: when the terminal device returns from an inactive state to an idle state, the network device sends indication information to the terminal device, where the indication information is used to indicate the mobility control parameter used when the terminal device is in the idle state, and the mobility control parameter used when the terminal device is in the idle state is the mobility control parameter configured for the inactive state or the mobility control parameter configured for the idle state.

Optionally, in the embodiments of the present application, the indication information is carried in a signaling indicating that the terminal device transits from the inactive state to the idle state or the system broadcast message.

Optionally, in the embodiments of the present application, the mobility control parameter includes at least one of the following parameters: a decision parameter of a mobile state of the terminal device, a scaling parameter of each parameter of a mobile state of the terminal device, and a frequency-based cell reselection priority parameter.

It should also be understood that the interaction between the network device and the terminal device and related characteristics, functions, and the like described at the network device correspond to related characteristics and functions of the terminal device. That is, what message is sent by the terminal device to the network device, and the network device receives the corresponding message from the terminal device.

It should also be understood that, in various embodiments of the present application, the number of the sequence numbers of the above processes does not mean the order of execution, and the order of execution of each process should be determined by its function and internal logic, and should not be construed as limiting the implementation process of the embodiments of the present application.

It should also be understood that the term "and/or" herein is merely an association describing the associated object, indicating that there may be three relationships. For example, A and/or B may indicate that there exist three cases: A exists separately, both A and B exist, and B exists separately. In addition, the character "/" herein generally indicates that the associated objects are in an "or" relationship.

The method for wireless communication according to the embodiments of the present application is described in detail above. Hereinafter, an apparatus for wireless communication according to an embodiment of the present application will be described with reference to FIG. 5 to FIG. 8. The technical features described in the method embodiments are applicable to the following apparatus embodiment.

Figure 5:
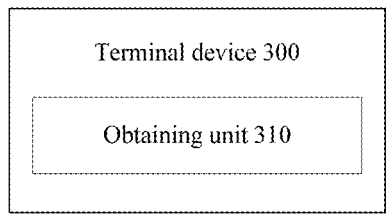
FIG. 5 shows a schematic block diagram of a terminal device of an embodiment of the present application.

FIG. 5 shows a schematic block diagram of a terminal device 300 according to an embodiment of the present application. As shown in FIG. 5, the terminal device 300 includes:

an obtaining unit 310 configured to obtain a mobility control parameter for performing cell selection and reselection in an inactive state.

Therefore, the terminal device in the embodiment of the present application is advantageous for controlling the mobility of the terminal device in an inactive state.

Optionally, in the embodiment of the present application, the obtaining unit is specifically configured to: obtain the mobility control parameter configured for the inactive state from the RRC dedicated signaling sent by the network device.

Optionally, in the embodiment of the present application, the terminal device further includes: a first receiving unit, configured to receive a radio resource control RRC connection release message sent by the network device, where the RRC connection release message is used to instruct the terminal device to enter the inactive state, and the RRC connection release message carries the mobility control parameter; the obtaining unit is specifically configured to: obtain the mobility control parameter configured for the inactive state from the RRC connection release message.

Optionally, in the embodiment of the present application, the obtaining unit is specifically configured to: obtain the mobility control parameter from a system broadcast message.

Optionally, in the embodiment of the present application, the terminal device further includes: a processing unit, configured to: if the mobility control parameter configured for the inactive state is obtained from the system broadcast message, perform cell selection and reselection by using the mobility control parameter configured for the inactive state when the terminal device is in the inactive state; if the mobility control parameter configured for the inactive state is not obtained from the system broadcast message, perform cell selection and reselection by using the mobility control parameter configured for an idle state when the terminal device is in the inactive state.

Optionally, in the embodiment of the present application, the mobility control parameter includes at least one of the following parameters: a decision parameter of a mobile state of the terminal device, a scaling parameter of each parameter of a mobile state of the terminal device, and a frequency-based cell reselection priority parameter.

Optionally, in the embodiment of the present application, the terminal device further includes: a second receiving unit, configured to receive indication information sent by the network device when the terminal device returns from the inactive state to the idle state, where the indication information is used to indicate the mobility control parameter used when the terminal device is in the idle state, and the mobility control parameter used when the terminal device is in the idle state is the mobility control parameter configured for the inactive state or the mobility control parameter configured for the idle state.

Optionally, in the embodiment of the present application, the indication information is carried in a signaling indicating that the terminal device transits from the inactive state to the idle state or the system broadcast message.

It should be understood that the terminal device 300 according to the embodiment of the present application may correspond to the terminal device in the method embodiment of the present application, and the above and other operations and/or functions of the respective units in the terminal device 300 respectively implement the corresponding process of the terminal device in the method of FIG. 3, which will not be repeated here for the sake of brevity.

Figure 6:
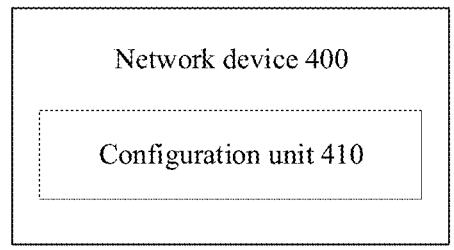
FIG. 6 shows a schematic block diagram of a network device of an embodiment of the present application.

FIG. 6 shows a schematic block diagram of a network device 400 of an embodiment of the present application. As shown in FIG. 6, the network device 400 includes:

a configuration unit 410 configured to configure, for the terminal device, a mobility control parameter for the inactive state.

Therefore, the network device in the embodiment of the present application is advantageous for controlling the mobility of the terminal device in an inactive state.

Optionally, in the embodiment of the present application, the configuration unit is specifically configured to: send the mobility control parameter for the inactive state to the terminal device through a radio resource control RRC dedicated signaling or a system broadcast message.

Optionally, in the embodiment of the present application, the RRC dedicated signaling is an RRC connection release message, and the RRC connection release message is used to instruct the terminal device to enter the inactive state.

Optionally, in the embodiment of the present application, the network device further includes: a sending unit, configured to send indication information to the terminal device when the terminal device returns from an inactive state to an idle state, where the indication information is used to indicate the mobility control parameter used when the terminal device is in the idle state, and the mobility control parameter used when the terminal device is in the idle state is the mobility control parameter configured for the inactive state or the mobility control parameter configured for the idle state.

Optionally, in the embodiment of the present application, the indication information is carried in a signaling indicating that the terminal device transits from the inactive state to the idle state or the system broadcast message.

Optionally, in the embodiment of the present application, the mobility control parameters include at least one of the following parameters: a decision parameter of a mobile state of the terminal device, a scaling parameter of each parameter of a mobile state of the terminal device, and a frequency-based cell reselection priority parameter.

It should be understood that the network device 400 according to the embodiment of the present application may correspond to the network device in the method embodiment of the present application, and the above and other operations and/or functions of the respective units in the network device 400 respectively implement the corresponding process of the network device in the method of FIG. 4, which will not be repeated here for the sake of brevity.

Figure 7:
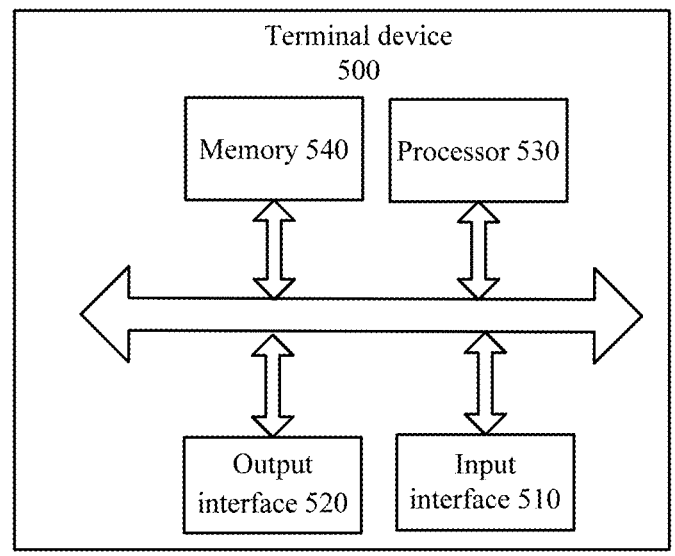
FIG. 7 shows another schematic block diagram of a terminal device of an embodiment of the present application.

As shown in FIG. 7, the embodiment of the present application further provides a terminal device 500, which may be the terminal device 300 in FIG. 5, and may be used to execute the content of the terminal device corresponding to the method 100 in FIG.3. The terminal device 500 includes: an input interface 510, an output interface 520, a processor 530, and a memory 540. The input interface 510, the output interface 520, the processor 530, and the memory 540 may be connected by a bus system. The memory 540 is for storing programs, instructions or codes. The processor 530 is configured to execute the programs, the instructions or the codes in the memory 540 to control the input interface 510 to receive a signal, control the output interface 520 to send a signal, and complete the operations in the foregoing method embodiments.

Therefore, the terminal device in the embodiment of the present application is advantageous for controlling the mobility of the terminal device in an inactive state.

It should be understood that in the embodiment of the present application, the processor 530 may be a Central Processing Unit (CPU), and the processor 530 may also be other general purpose processors, digital signal processors (DSPs), application specific integrated circuits (ASICs), field programmable gate arrays (FPGAs) or other programmable logic devices, discrete gates or transistor logic devices, discrete hardware components, etc. The general purpose processor may be a microprocessor, or the processor may also be any conventional processor, etc.

The memory 540 may include a read only memory and a random access memory, and provides instructions and data to the processor 530. A portion of the memory 540 may also include a non-volatile random access memory. For example, the memory 540 may also store information of the device type.

In the implementation process, each step of the foregoing method may be completed by an integrated logic circuit of hardware in the processor 530 or an instruction in a form of software. The method disclosed in the embodiment of the present application may be directly implemented by the hardware processor, or may be performed by a combination of hardware and software modules in the processor. The software module may be located in a mature storage medium in the art such as a random access memory, a flash memory, a read only memory, a programmable read only memory or an electrically erasable programmable memory, a register, and the like. The storage medium is located in the memory 540, and the processor 530 reads the information in the memory 540 and completes the steps of the above method in combination with its hardware. To avoid repetition, it will not be described in detail here.

In a specific embodiment, the first receiving unit and the second receiving unit in the terminal device 300 may be implemented by the input interface 510 in FIG. 7. The obtaining unit and processing unit in the terminal device 300 may be implemented by the processor 530 in FIG. 7.

Figure 8:
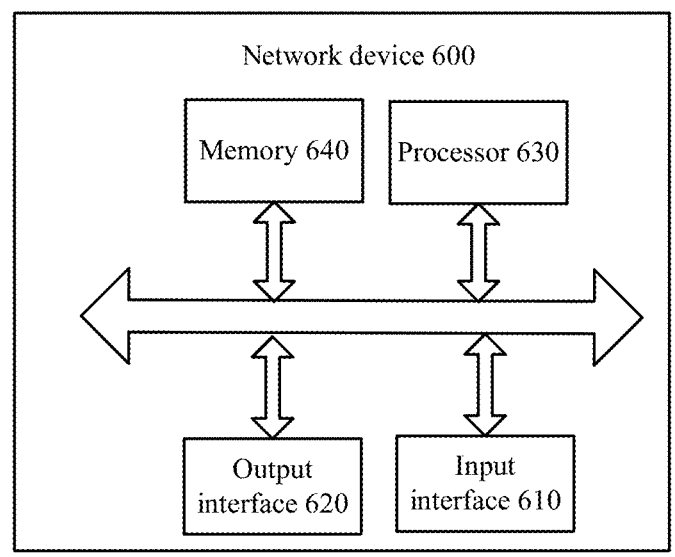
FIG. 8 shows another schematic block diagram of a network device of an embodiment of the present application.

As shown in FIG. 8, the embodiment of the present application further provides a network device 600, which may be the network device 400 in FIG. 6, and may be used to execute the content of the network device corresponding to the method 200 in FIG.4. The network device 600 includes an input interface 610, an output interface 620, a processor 630, and a memory 640. The input interface 610, the output interface 620, the processor 630, and the memory 640 may be connected by a bus system. The memory 640 is for storing programs, instructions or codes. The processor 630 is configured to execute the programs, the instructions or the codes in the memory 640 to control the input interface 610 to receive a signal, control the output interface 620 to send a signal, and complete the operations in the foregoing method embodiments.

Therefore, the network device in the embodiment of the present application is advantageous for controlling the mobility of the terminal device in an inactive state.

It should be understood that in the embodiment of the present application, the processor 630 may be a Central Processing Unit (CPU), and the processor 530 may also be other general purpose processors, digital signal processors (DSPs), application specific integrated circuits (ASICs), field programmable gate arrays (FPGAs) or other programmable logic devices, discrete gates or transistor logic devices, discrete hardware components, etc. The general purpose processor may be a microprocessor, or the processor may also be any conventional processor, etc.

The memory 640 may include a read only memory and a random access memory, and provides instructions and data to the processor 630. A portion of the memory 640 may also include a non-volatile random access memory. For example, the memory 640 may also store information of the device type.

In the implementation process, each step of the foregoing method may be completed by an integrated logic circuit of hardware in the processor 630 or an instruction in a form of software. The method disclosed in the embodiment of the present application may be directly implemented by the hardware processor, or may be performed by a combination of hardware and software modules in the processor. The software module may be located in a mature storage medium in the art such as a random access memory, a flash memory, a read only memory, a programmable read only memory or an electrically erasable programmable memory, a register, and the like. The storage medium is located in the memory 640, and the processor 630 reads the information in the memory 640 and completes the steps of the above method in combination with its hardware. To avoid repetition, it will not be described in detail here.

In a specific implementation, the configuration unit in network device 400 may be implemented by the processor 630 in FIG. 8. The sending unit in network device 400 may be implemented by the output interface 620 in FIG. 8.

Those ordinary skilled in the art will appreciate that the exemplary units and the steps of the algorithm described in connection with the embodiments disclosed herein may be implemented in electronic hardware or a combination of computer software and electronic hardware. Whether these functions are performed in hardware or software depends on the specific application and design constraints of the technical solution. A skilled person may use different methods to implement the described functionality for each particular application, but such implementation should not be considered beyond the scope of this application.

A skilled person in the art can clearly understand that for the convenience and brevity of the description, the specific working process of the system, the apparatus and the unit described above may refer to the corresponding process in the foregoing method embodiment, and details are not described herein again.

In the several embodiments provided by the present application, it should be understood that the disclosed systems, apparatuses, and methods may be implemented in other manners. For example, the apparatus embodiments described above are merely illustrative. For example, the division of the unit is only a logical function division. In actual implementation, there may be another division manner, for example, multiple units or components may be combined or may be integrated into another system, or some features may be ignored or not executed. In addition, the mutual coupling or direct coupling or communication connection shown or discussed may be an indirect coupling or communication connection through some interface, apparatus or unit, and may be in an electrical, mechanical or other form.

The units described as separate components may or may not be physically separated, and the components of the displayed units may or may not be physical units, that is, may be located in one place, or may be distributed to multiple network units. Some or all of the units may be selected according to actual needs to achieve the purpose of the solution of the embodiment.

In addition, individual functional units in individual embodiments of the present application may be integrated into one processing unit, or individual units may exist physically separately, or two or more units may be integrated into one unit.

This functionality, if implemented as a software functional unit and sold or used as a standalone product, may be stored on a computer readable storage medium. Based on such understanding, the technical solution of the present application or the part contributing to the prior art or the part of the technical solution may be embodied in the form of a software product, which is stored in a storage medium, including instructions to cause a computer device (which may be a personal computer, a server, or a network device, etc.) to perform all or part of the steps of the method of various embodiments of the present application. The foregoing storage medium includes: a U disk, a mobile hard disk, a Read-Only Memory (ROM), a Random Access Memory (RAM), a magnetic disk, or an optical disk, and other medium which may store program code.

The above is only the specific embodiments of the present application, and the protection scope of the present application is not limited thereto. Any person skilled in the art can easily think of changes or replacements within the technical scope disclosed in the present application, which should be covered in the scope of protection of this application. Therefore, the scope of protection of the embodiments of the present application should be determined by the protection scope of the claims.

What is claimed is:

1. A method for wireless communication, comprising:
   obtaining, by a terminal device, a mobility control parameter for performing cell reselection in an inactive state,
   wherein the obtaining, by a terminal device, a mobility control parameter for performing cell reselection in an inactive state comprises:
     receiving, by the terminal device, a radio resource control (RRC) connection release message sent by a network device, wherein the RRC connection release message comprises a release cause value for instructing the terminal device to enter the inactive state, and the RRC connection release message carries the mobility control parameter; and
     obtaining, by the terminal device, the mobility control parameter configured for the inactive state from the RRC connection release message,
   wherein the mobility control parameter comprises: a decision parameter of a mobile state of the terminal device, and a scaling parameter of each parameter of the mobile state of the terminal device,
   wherein the decision parameter of the mobile state of the terminal device comprises: a time window $T_{CRmax}$ for indicating that the terminal device enters a medium-speed or high-speed mobile state decision, a cell reselection number threshold $N_{CR\_H}$ for indicating the high-speed mobile state decision, a cell reselection number threshold $N_{CR\_M}$ for indicating a medium-speed mobile state decision, and a time window $T_{CRmaxHyst}$ for indicating that the terminal device leaves the medium-speed or high-speed mobile state decision,
   wherein the scaling parameter is a scaling factor used in cell selection and reselection, and
   wherein obtaining, by the terminal device, the mobility control parameter for recovering the radio resource control (RRC) connection in the inactive state, comprises obtaining, by the terminal device, the mobility control parameter from a system broadcast message.

2. A terminal device, comprising:
   a memory;
   a processor;
   an input interface; and
   an output interface,
   wherein the memory, the processor, the input interface, and the output interface are connected by a bus system, the memory is for storing instructions, and the processor is for executing the instructions stored in the memory to: obtain a mobility control parameter for performing cell reselection in an inactive state,
   wherein the processor is further configured to:
     receive a radio resource control (RRC) connection release message sent by a network device, wherein the RRC connection release message comprises a release cause value for instructing the terminal device to enter the inactive state, and the RRC connection release message carries the mobility control parameter; and
     obtain the mobility control parameter configured for the inactive state from the RRC connection release message, and
   wherein the mobility control parameter comprises: a decision parameter of a mobile state of the terminal device, and a scaling parameter of each parameter of a mobile state of the terminal device,
   wherein the decision parameter of the mobile state of the terminal device comprises: a time window $T_{CRmax}$ for indicating that the terminal device enters a medium-speed or high-speed mobile state decision, a cell reselection number threshold $N_{CR\_H}$ for indicating the high-speed mobile state decision, a cell reselection number threshold $N_{CR\_M}$ for indicating a medium-speed mobile state decision, and a time window $T_{CRmaxHyst}$ for indicating that the terminal device leaves the medium-speed or high-speed mobile state decision,
   wherein the scaling parameter is a scaling factor used in cell selection and reselection, and
   wherein the processor is further configured to obtain the mobility control parameter from a system broadcast message.

3. A network device, comprising:
   a memory;
   a processor;
   an input interface; and
   an output interface,
   wherein the memory, the processor, the input interface, and the output interface are connected by a bus system, the memory is for storing instructions, and the processor is for executing the instructions stored in the memory to: configure, for a terminal device, a mobility control parameter for an inactive state,
   wherein the processor is further configured to:
   send the mobility control parameter for the inactive state to the terminal device through radio resource control (RRC) dedicated signaling from a system broadcast message,
   wherein the RRC dedicated signaling is an RRC connection release message, and wherein the RRC connection release message comprises a release cause value for instructing the terminal device to enter the inactive state, and
   wherein the mobility control parameter comprises: a decision parameter of a mobile state of the terminal device, and a scaling parameter of each parameter of a mobile state of the terminal device,
   wherein the decision parameter of the mobile state of the terminal device comprises: a time window $T_{CRmax}$ for indicating that the terminal device enters a medium-speed or high-speed mobile state decision, a cell reselection number threshold $N_{CR\_H}$ for indicating the high-speed mobile state decision, a cell reselection number threshold $N_{CR\_M}$ for indicating a medium-speed mobile state decision, and a time window $T_{CRmaxHyst}$ for indicating that the terminal device leaves the medium-speed or high-speed mobile state decision, wherein the scaling parameter is a scaling factor used in cell selection and reselection.

* * * * *